United States Patent

Lansdowne

[15] 3,668,535

[45] June 6, 1972

[54] LOGARITHMIC RF AMPLIFIER EMPLOYING SUCCESSIVE DETECTION

[72] Inventor: Kenneth H. Lansdowne, Deer Park, N.Y.

[73] Assignee: Varian Associates, Palo Alto, Calif.

[22] Filed: Jan. 15, 1970

[21] Appl. No.: 3,164

[52] U.S. Cl. ..............................329/192, 307/229, 307/237, 328/145, 329/146, 343/119, 343/16 R

[51] Int. Cl. ..........................................................H03d 1/10

[58] Field of Search ..................329/192, 145, 146; 328/145; 343/16, 16 M, 16 S, 119; 307/229, 237

[56] References Cited

UNITED STATES PATENTS

| | | | |
|---|---|---|---|
| 3,423,682 | 1/1969 | Cauchois | 328/145 X |
| 3,517,216 | 6/1970 | Cope | 307/237 |
| 3,435,353 | 3/1969 | Sauber | 329/146 X |
| 3,403,347 | 9/1968 | Stull | 329/145 |
| 3,393,369 | 7/1968 | Embley et al. | 307/237 |
| 3,020,420 | 2/1962 | Smee | 307/237 X |

*Primary Examiner*—Alfred L. Brody
*Attorney*—Stanley Z. Cole and Gerald L. Moore

[57] ABSTRACT

A logarithmic radio frequency amplifier is disclosed which employs a series of cascaded RF amplifier stages. Each amplifier stage includes a detector for demodulating the output of each amplifier to produce a video signal. A limiter is provided for each detector for limiting the video signal output of each of the detectors. The limited video output from each successive stage is applied to a summing delay line to produce the logarithmic video output at the end of the delay line.

4 Claims, 7 Drawing Figures

INVENTOR.
KENNETH H. LANSDOWNE

INVENTOR.
KENNETH H. LANSDOWNE

INVENTOR.
KENNETH H. LANSDOWNE

LOGARITHMIC RF AMPLIFIER EMPLOYING SUCCESSIVE DETECTION

DESCRIPTION OF THE PRIOR ART

Heretofore, logarithmic radio frequency amplifiers have been constructed which employed a number of RF amplifiers connected in series for cascade amplification of the input signal. The output from each amplifier stage was applied to a radio frequency limiter and the output from each of the limiters was detected to produce a video output which was fed to a summing line. The video logarithmic output was taken from the output end of the summing line. The problem with this prior art arrangement was that the limiter operated at the radio frequency of the input signal. At these relatively high frequencies, the bandwidth of a radio frequency limiter is rather severely restricted, and the input and output impedances change in a relatively uncontrolled manner with amplitude of the RF input and with temperature. In addition, a detuning effect was obtained when the limiter saturated thus, producing pulse distortion and destroying the logging accuracy of the logarithmic amplifier. Logging accuracy is preferably held to plus or minus 1 db for certain applications such as monopulse direction finding where a matched pair of such log amplifiers amplify the output of a pair of receiving antennas having overlapping lobes. Differences in the logging accuracy of the outputs of the log amplifiers introduces an error in the direction finding information. Thus, it is desired to obtain an improved log amplifier having improved logging accuracy, bandwidth, and temperature response.

SUMMARY OF THE PRESENT INVENTION

The principal object of the present invention is the provision of an improved logarithmic RF amplifier of the type employing successive detection.

One feature of the present invention is the provision, in a logarithmic RF amplifier employing successive detection, of limiters for each stage of amplification such limiters operating on the demodulated output of each of the detectors, whereby the limiters are operable at the lower frequency of the modulation if any, on the RF input.

Another feature of the present invention is the same as the preceding feature wherein each of the aforementioned limiter means is connected in series between each of the detector means and a load connected across the output of the summing means employed to sum the outputs of successive stages of amplification, whereby a constant current source may be employed for biasing the limiter means to substantially improve the temperature response thereof as contrasted with an arrangement wherein the limiter is connected in shunt with the output load of the summing means.

Another feature of the present invention is the same as the first feature wherein each of the limiters is connected in parallel with a load connected across the output of the summing means employed to sum the outputs of each of the successive amplifier stages.

Other features and advantages of the present invention will become apparent upon a perusal of the following specification taken in connection with the accompanying drawings wherein:

DESCRIPTION OF THE PREFERRED EMBODIMENTS

Figure 1:
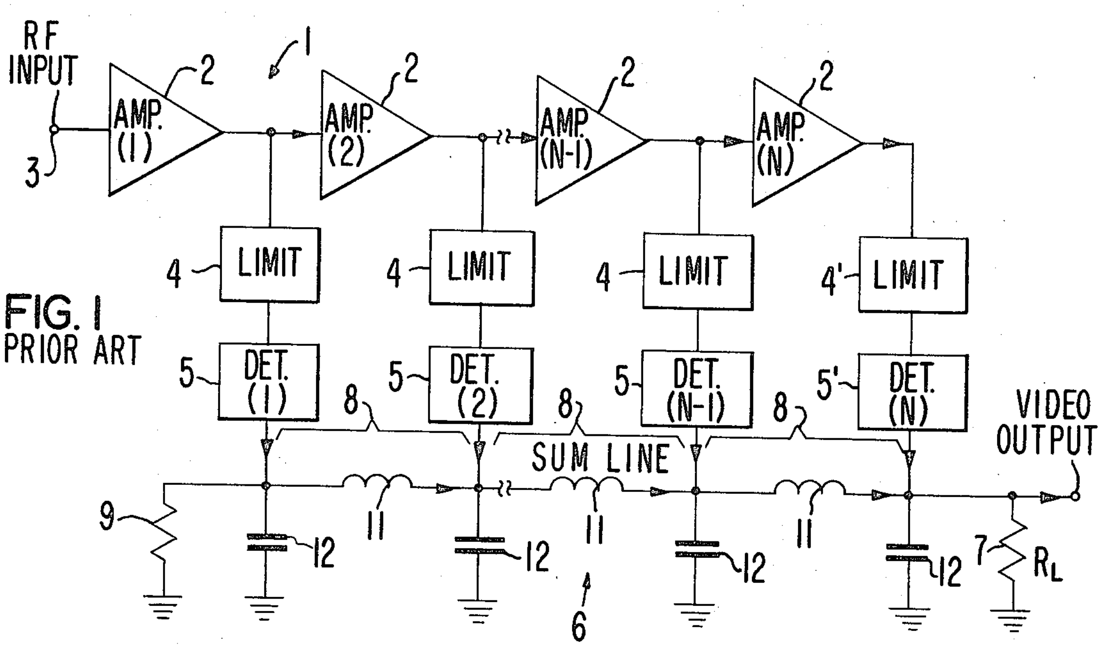
FIG. 1 is a schematic circuit diagram, partly in block diagram form, depicting the prior art logarithmic RF amplifier.

Referring now to FIG. 1 there is shown the prior art logarithmic RF amplifier 1. The amplifier 1 includes N number of RF amplifiers 2 connected in series to receive and cascade amplify an input RF signal applied to input terminal 3. A radio frequency limiter 4 is connected to the output of each of the amplifiers 2 for limiting the RF output of successive amplifier stages. The limiters 4 are set to saturate at a certain predetermined RF power level. The output of each limiter 4 is fed to a detector 5 which demodulates the signal passed by the limiter to produce a video output which is introduced onto a summing line 6 such that the video outputs of successive cascaded amplifier stages are added on the summing line to produce the total output video signal across load resistor 7 connected across one end of the summing line 6.

The summing line 6 comprises a delay line formed by a succession of delay sections 8, each delay section having a delay substantially equal to the delay encountered by the signal being amplified in passing through each of the successive stages of amplification such that the video outputs from successive stages are added in phase on the sum line 6 and fed to the load resistor 7. The input end of the sum line 6 is terminated by a matching load resistor 9. Each successive section 8 of the delay line is schematically represented by the series inductors 11 and shunt capacitors 12.

Figure 2:
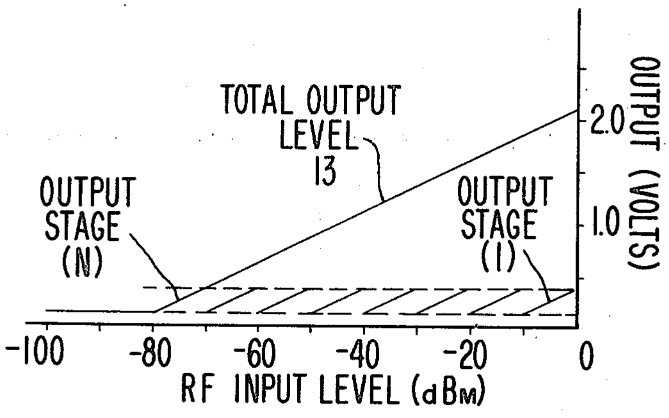
FIG. 2 PRIOR ART
FIG. 2 is a plot of RF input level in decibels below a milliwatt versus output volts and depicting the theoretical optimum performance characteristics of a logarithmic RF amplifier employing successive detection.

Referring now to FIGS. 1 and 2, the performance characteristics of the amplifier of FIG. 1 will be described in greater detail. The amplifier 1 of FIG. 1 is typically employed in a situation where it is desired to accept RF input signals covering an extremely wide range of input power levels, such as, from 0 to −80 decibels below a milliwatt and to produce a linear video output signal covering a much smaller range, such as, from 0 to 2.5 volts. More particularly, the amplifier 1 is a logarithmic RF amplifier wherein the amplitude of the video output $E_0$ is equal to a constant K times the log of the amplitude of the RF input signal $E_1$. In operation, an RF input signal $E_1$ is applied to the input terminal 3 of the cascaded stages 2. The RF input signal is successively amplified and the nth detector 5′ will eventually be driven into conduction as the signal level increases. Thus, there is a certain threshold level for the last or *n*th detector below which no output for the amplifier will be observed. In the case of the performance characteristic curve of FIG. 2, there are eight cascaded amplifier stages 2 with each amplifier stage 2 having a 10 db dynamic range. Thus, the first detector N which is driven into conduction is the *n*th detector 5′ and the video output voltage from the *n*th detector 5′ starts from a certain threshold value and contributes a near linear output voltage to the sum line 6 which is proportional to the log of the input RF signal over a first 10 db dynamic range of the input signal.

An increase in drive level above the first 10 db dynamic range will cause the nth limiter 4′ to saturate. At the same time amplifier stage (N−1) will start to drive detector (N−1) into conduction. Detector (N−1) will supply a near linear video output voltage to the sum line 6 for the next 10 db of RF input signal dynamic range. The output level developed by the (N−1) amplifier stage will be identical to that supplied by the *n*th detector during the previous 10 db dynamic range. The same process of detection and limiting will be repeated by all stages in the amplifier 1. Since all the detectors 5 drive a common sum line 6, the video output of the delay line is the arithmetic sum of the video outputs of all of the detectors 5. Thus, a video output voltage proportional to the logarithm 1 of the input signal amplitude is produced, as shown by curve 13 of FIG. 2.

The problem with the prior art amplifier 1 of FIG. 1 is that RF limiters are difficult to build which will have a uniformly low loss over a given relatively wide passband and which will limit uniformly at a given RF signal level regardless of operating temperature.

Figure 3:
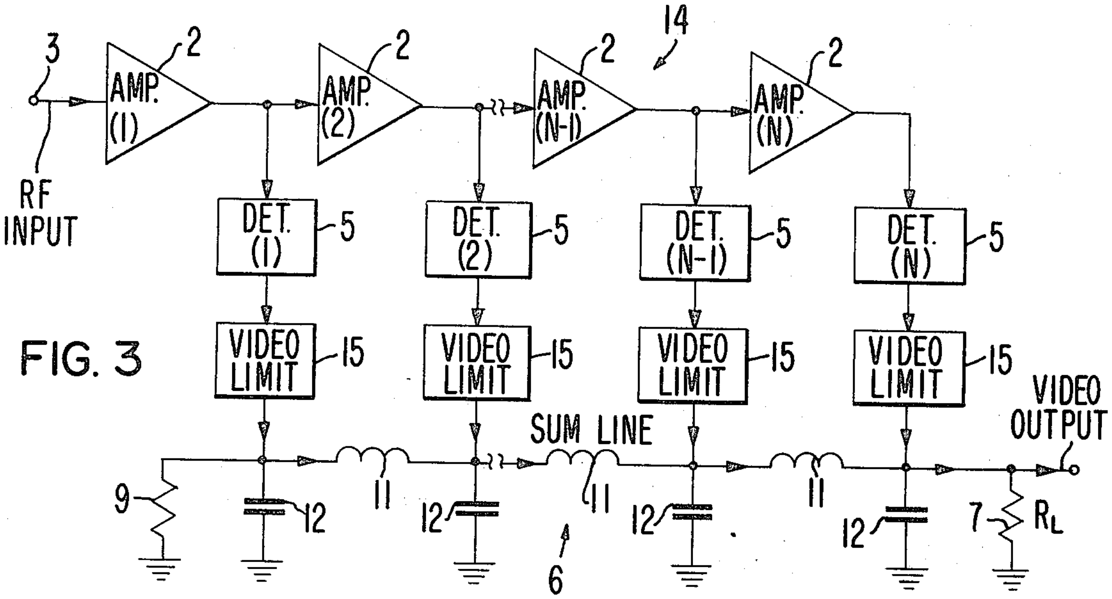
FIG. 3 is a schematic circuit diagram, partly in block diagram form, depicting a logarithmic RF amplifier of the present invention.

Referring now to FIG. 3, there is shown a logarithmic RF amplifier 14 of the present invention. The amplifier 14 is substantially the same as that of FIG. 1 with the exception that the limiter 4 of FIG. 1 has been replaced by a video limiter 15 disposed between the detector 5 and the summing line 6. The advantages of employing a video limiter 15 instead of an RF limiter 4 are that the video limiter 15 can be used over an extremely wide range of bandwidths and center frequencies. The limiting occurs while the amplifier 2 is still in the linear region. If the amplifier 2 is overdriven into its limiting region, any distortion of the passband is unimportant since it will not be passed by the video limiter 15. The linear limiting characteristics of the video limiter 15 are far superior to those of the conventional radio frequency limiter 4. For example, the output curve of a video limiter 15 will transition from the linear region to "hard" limiting in less than 1 db of input level change. Thus, a more accurate control of the logarithmic output characteristic is provided without upsetting the bandpass or gain of the linear amplifier stage 2. Thus, employing a video limiter 15 between the detector 5 and the summing line 6 improves the performance of the amplifier with regard to logging accuracy, center frequency range, bandwidth, and temperature stability.

Figure 4:
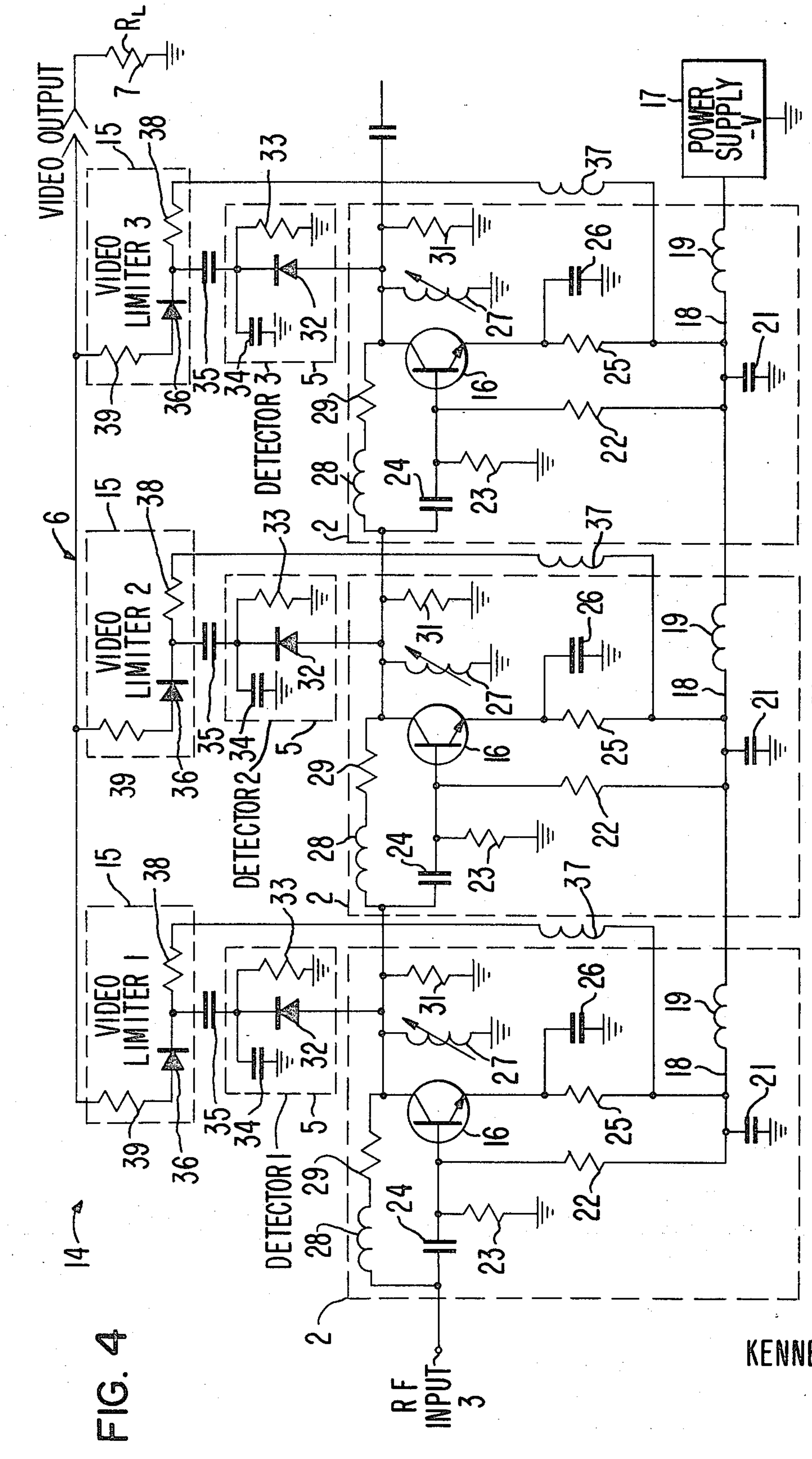
FIG. 4 is a circuit diagram of an amplifier of the type depicted in FIG. 3 and employing series video limiters.

Referring now to FIG. 4, there is shown a circuit diagram for the logarithmic amplifier 14 of FIG. 3. In this embodiment the video limiter network 15 is disposed in series between the detector 5 and the load resistor 7. The mode of operation and advantages of the series connected limiter will be described below. Briefly, each amplifier 2 includes a transistor 16, such as a (2N918), connected as a grounded emitter. A bias voltage for the base of the transistor 16 is derived from a power supply 17 via a power line 18 which includes series inductors and shunt capacitors 19 and 21, respectively, to provide power line filtering. A pair of series connected resistors 22 and 23 provide a voltage divider network for applying proper bias voltage to the base of the transistor 16. A signal coupling capacitor 24 couples the input RF signal from input terminal 3 to the base electrode of the transistor 16. A bias resistor 25 is connected between the emitter electrode and the power supply line 18 for deriving the proper d.c. bias current for the transistor 16. An RF bypass capacitor 26 is connected between the emitter and ground. A variable inductor 27 is connected between the collector electrode of the transistor 16 and ground for tuning the amplifier 2 to the center of the passband such tuning inductor 27 cooperating with the stray capacitance of the circuit to determine the resonant frequency of the amplifier. An inductor 28 and a resistor 29 are connected in series between the collector electrode and the input terminal 3 to provide a negative feedback for increasing the bandwidth of the amplifier 2. A load resistor 31, as of 100 ohms, is connected between the collector electrode of the transistor 16 and ground. The input of the next successive amplifier stage 2 is connected to the collector electrode 17 of the transistor 16.

The video detector 5 is connected to the collector of the transistor 16. The video detector 5 includes a series connection of a diode 32, such as a (HP2303) diode, and a detector load resistor 33 to ground. A radio frequency bypass capacitor 34 is connected in parallel with resistor 33. The output of the video detector 5, as derived across the load resistor 33, is fed by a video coupling capacitor 35 to the input of video limiter 15.

Video limiter 15 includes a forward biased diode 36, such as a (HP2303) diode. The forward bias current for the limiter diode 36 is derived from power supply line 18 via video choke 37 and a bias resistor 38 having a relatively high value of resistance, such as 100 kilohms, such that the forward bias current for the video limiter diode 36 appears to come from a constant current bias source. In this manner, voltage drop effects in the diode due to temperature have substantially no effect on the diode bias current and, thus, the limiting point for the video limiter diode 36 is stabilized. The limiter diode 36 is connected in series between the output of the detector 5 and the load resistor 7 of the summing line 6. An isolation resistor 39 as of 10 times the resistance of the load resistor 7 is connected between the diode 36 and the summing line 6.

Figure 5:
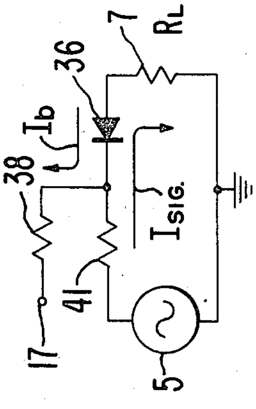
FIG. 5 is a simplified equivalent circuit diagram of the series video limiter circuit employed in the circuit of FIG. 4.

A simplified equivalent circuit for a series connected video limiter 15 is shown in FIG. 5. The forward bias current $I_b$ is caused to flow through the load resistor 7, limiter diode 36, isolation resistor 39 and bias source impedance 38. On the other hand the signal current $I_{sig}$ is caused to flow from the output of the video detector 5 through its series equivalent output impedance 41, video limiting diode 36, isolation resistor 39, and load resistor 7 to ground. Limiting occurs when $I_{sig}$=I at which point no additional signal current may flow in RL as the limiter diode becomes back biased. The temperature stability of the series connected video limiter diode 36 is far superior to a shunt connection of such a limiter, to be described below. This is true because the series biased current $I_b$ is generated from a constant current bias source and the change in the forward voltage drop of the diode 36 versus temperature will not change the diode output current. Therefore, the limiting current level will remain constant with changes in temperature.

Figure 6:
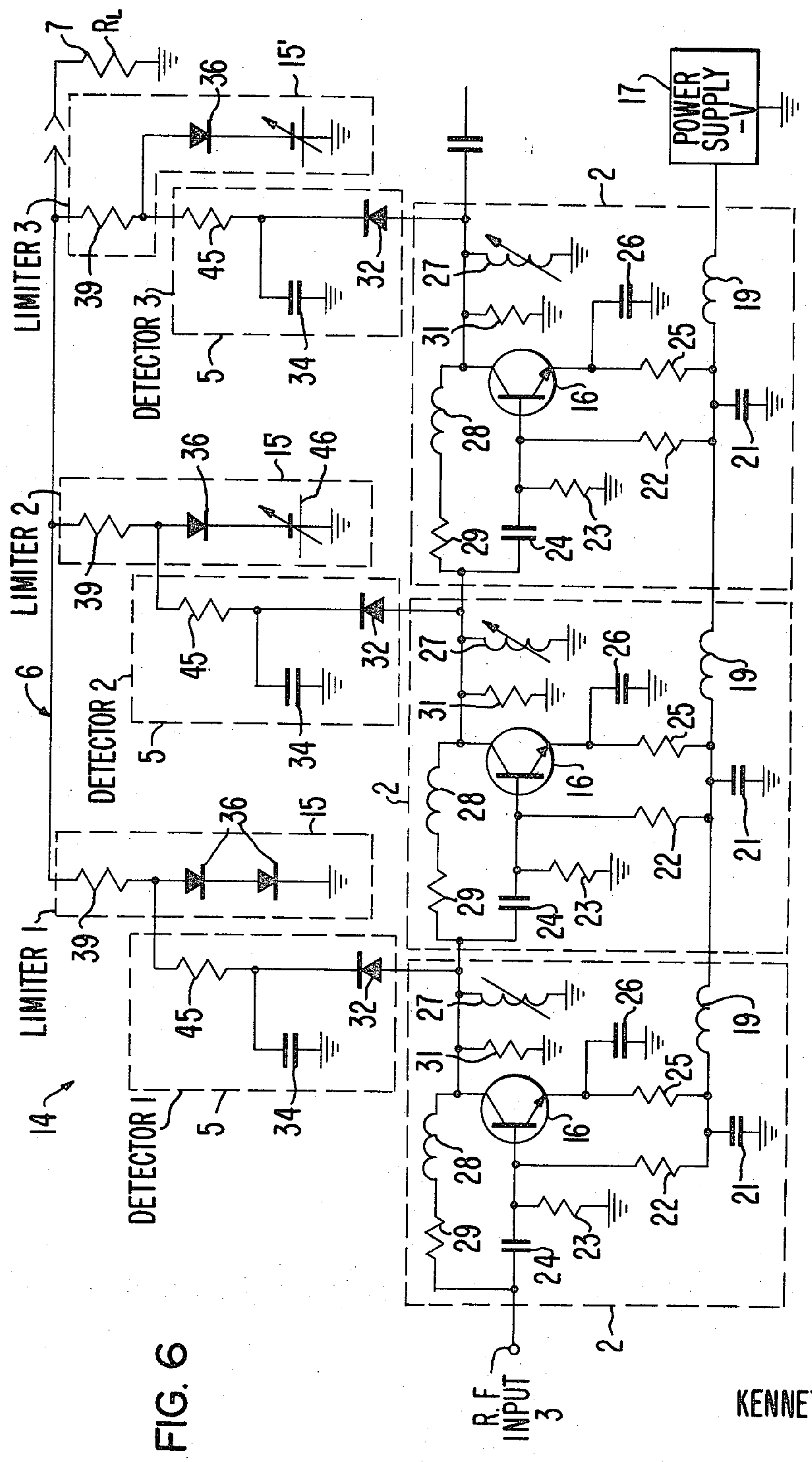
FIG. 6 is a circuit diagram of an alternative logarithmic amplifier of the type depicted in FIG. 3 and employing shunt video limiters.
Figure 7:
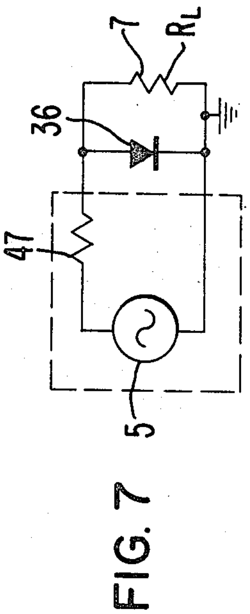
FIG. 7 is a simplified equivalent circuit diagram of the shunt video limiter portion of the circuit of FIG. 6.

Referring now to FIG. 6, there is shown an alternative embodiment to the logarithmic amplifier 13 of FIG. 3. In this embodiment the circuit is substantially the same as that previously described with regard to FIG. 4 with the exception that the video limiter 15 is connected such that the limiting diode structure is connected in parallel with the load resistance 7 to provide shunt video limiting. More particularly, the video detector 5 includes an impedance matching resistor 45 connected in series between the video detector diode 32 and the input to the video limiter 15. The video limiter 15 includes the isolating resistor 39 connected in series between the matching resistor 45 and the load resistor 7. A pair of limiter diodes 36 are connected in series with each other to ground and in shunt with the load resistor 7 and in shunt with the output of the video detector 5. A pair of the limiter diodes 36 are connected in series with each other in order to obtain the proper forward voltage bias characteristic or determining the limiting level. Thus, in this particular case, the limiting level is determined by the forward voltage drop characteristics of the diode themselves as opposed to the provision of a forward bias current derived from a constant current source, such as that previously described with regard to FIGS. 4 and 5. The problem with the shunt video limiter 15 of FIGS. 6 and 7 is that the forward voltage drop characteristics of the diodes 36 change with temperature and this causes the limiting current operating point to vary as much as 30 percent over a relatively wide range of operating temperature encountered in operation of the circuit.

As an alternative to the use of two series connected diode limiters 36, a single diode limiter 36 may be employed with a back bias voltage source 46 as depicted in the video limiter circuit 15', shown following the second stage amplifier detector 5. Use of the variable voltage back bias source 46 facilitates setting of the bias but this circuit is still subject to temperature dependent changes in the limiting level due to the forward voltage drop characteristics of the diode 36 changing with temperature. The equivalent circuit for the shunt connected video limiter 15 is shown in FIG. 7 wherein the output of the video detector 5, as derived through the source impedance 47 of the video detector 5, is applied in parallel across the resistor 7 and the limiter diode 36. Use of the video limiter 15 instead of the RF limiter 4 of the prior art greatly increases the passband of the amplifier 14 of the present invention. More particularly, in a typical example the passband was increased from 5 to 67 percent, thereby obtaining octave bandwith.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a logarithmic radio frequency amplifier for amplifying an input RF signal and producing an amplified detected envelope output which is a function of the logarithm of the amplitude of the RF input signal, a succession of series RF amplifier means for cascade amplifying the RF input signal, a succession of detector means each being disposed for detection of the envelope of the RF output signal derived from each RF amplifier to produce a succession of demodulated output signals, a succession of limiter means each being disposed for limiting the maximum amplitude of a signal derived from each of said amplifiers, means for summing the succession of demodulated output signals derived from each of said amplifiers to produce the amplified logarithmic detected envelope output signal, THE IMPROVEMENT WHEREIN, each of said limiter means is connected to receive and operate on the demodulated output signal derived from each of said detector means, whereby said limiter means are operable at the lower frequency of the modulation, if any, on the RF input.

2 The apparatus of claim 1 wherein each of said limiter means is connected in series between said detector means and the output of said summing means.

3. The apparatus of claim 1 wherein each of said limiter means is connected in parallel with a respective one of said detectors and the output of said summing means.

4. The apparatus of claim 1 wherein said summing means include a delay line to which the outputs of said separate limiter means are connected at successive intervals along said delay line with the signal delay between each successive connection on said delay line being approximately equal to the delay experienced by the signal being amplified in passing through each successive cascaded amplifier, and the respective detector and limiter such that the demodulated output signals from successive amplification stages add in phase on said delay line.

* * * * *